United States Patent [19]
Kawawaki et al.

[11] Patent Number: 5,371,694
[45] Date of Patent: Dec. 6, 1994

[54] SCIENTIFIC CALCULATOR

[75] Inventors: Fumiaki Kawawaki, Shiki; Hideyasu Koumo, Yamatokoriyama, both of Japan

[73] Assignee: Sharp Kabushiki Kaisha, Osaka, Japan

[21] Appl. No.: 52,749

[22] Filed: Apr. 27, 1993

[30] Foreign Application Priority Data

May 1, 1992 [JP] Japan .................................. 4-112629

[51] Int. Cl.$^5$ ............................ G06F 3/00; G06F 7/00; G06F 15/02
[52] U.S. Cl. ................... 364/709.16; 364/706; 364/709.15; 364/715.05
[58] Field of Search ................... 364/700, 705.06, 706, 364/715.01, 715.03, 715.05, 709.16, 709.15

[56] References Cited

U.S. PATENT DOCUMENTS

| | | | |
|---|---|---|---|
| 4,099,246 | 6/1978 | Osborne et al. | 364/709.16 |
| 4,481,598 | 11/1984 | Ishiwata | 364/715.05 X |
| 4,686,643 | 8/1987 | Ishiwata | 364/715.05 |
| 5,101,368 | 3/1992 | Kaplan | 364/715.05 |
| 5,216,627 | 6/1993 | McClellan et al. | 364/700 |

FOREIGN PATENT DOCUMENTS 58-178459 10/1983 Japan .
62-166551 10/1987 Japan .

*Primary Examiner*—Roy N. Envall, Jr.
*Assistant Examiner*—Chuong D. Ngo
*Attorney, Agent, or Firm*—Nixon & Vanderhye

[57] ABSTRACT

A scientific calculator includes a conversion table memory for storing as a conversion table a combination of each kind of conversion equation and a selection number, a key board providing numeric keys and a specific key, a numeric value memory for storing the entered numeric values, a mode setting section for setting the current mode to a conversion mode, a designating section for designating the selection number during conversion mode, reading section for reading from the conversion table the conversion equation corresponding to the designated selection number, a conversion section for converting the numeric value stored in the numeric value memory from one unit to another on the basis of the read conversion equation, and a display section for displaying the converted numeric value.

5 Claims, 8 Drawing Sheets

FIG. 5

| NO | KEY OPERATION | DISPLAY | REMARK | |
|---|---|---|---|---|
| 1 | [ON/C] | 0. | CLEAR CALCULATION | 601 |
| 2 | 1.23 | 1.23 | ENTER VALUE TO BE CONVERTED | 602 |
| 3 | [CONV] | ?<br>01-98 [ _ ] | GUIDANCE DISPLAY FOR CONVERSION CALCULATION SELECTION (NUMERIC VALUE IN THE FIRST DIGIT ENTERED) | 603 |
| 4 | 0 | ?<br>01-98 [0_] | GUIDANCE DISPLAY FOR CONVERSION CALCULATION SELECTION (NUMERIC VALUE IN THE SECOND DIGIT ENTERED) | 604 |
| 5 | 1 | ?<br>01-98'[01] | ENTERED NUMERIC VALUE 01 TEMPORARILY DISPLAYED TO AUTOMATICALLY PROCEED TO 6 | 605 |
| 6 | | 3.1242 | in→cm CALCULATION CORRESPONDING TO NUMBER 01 PERFORMED | 606 |

FIG. 6

| NUMBER | NAME | CONVERSION EQUATION |
|---|---|---|
| 01 | in → cm | 1 in = 2.54 cm |
| 02 | cm → in | |
| 03 | ft → m | 1 ft = 3.048 × $10^{-1}$ m |
| 04 | m → ft | |
| 05 | yd → m | 1 yd = 9.144 × $10^{-1}$ m |
| 06 | m → yd | |
| 07 | mi → km | 1 mi = 1.609344 km |
| 08 | km → mi | |
| 09 | sea mile → m | 1 sea mile = 1.852 × $10^{3}$ m |
| 10 | m → sea mile | |
| 11 | acre → m² | 1 acre = 4.0468564224 × $10^{3}$ m² |
| 12 | m² → acre | |
| ⋮ | ⋮ | ⋮ |
| 97 | oz → g | 1 oz = 2.8349523125 × $10^{1}$ g |
| 98 | g → oz | |

FIG. 8 (PRIOR ART)

| NO | KEY OPERATION | DISPLAY | REMARK | |
|----|---------------|---------|--------|---|
| 1 | [ON/C] | 0. | CLEAR CALCULATION REMARK | 901 |
| 2 | 1.23 | 1.23 | ENTER NUMERIC VALUE TO BE CONVERTED | 902 |
| 3 | [2ndf] | 2ndf 1.23 | SPECIFY THE SECONDARY FUNCTION | 903 |
| 4 | 0 | 3.1242 | PERFORM in→cm GIVEN AS THE SECONDARY FUNCTION OF 0 KEY | 904 |

SCIENTIFIC CALCULATOR

BACKGROUND OF THE INVENTION

1. Field of the Invention

The present invention relates to scientific calculators, and more particularly to a scientific calculator capable of converting one unit into another.

2. Description of the Prior Art

Conventional scientific calculators include a calculator capable of converting a numeric value entered with a certain unit into a numeric value with a different unit. For example, some calculators designed for scientific calculations are provided with a unit conversion function to perform a conversion calculation of physical units. Some calculators designed for travelers are capable of converting one currency unit into another.

Since scientific calculators, which are a small size electronic device, have only a limited number of keys, unit conversion functions are incorporated in keys for entering numeric values with the result that the unit conversion functions are performed by operating keys for entering numeric values 0 to 9 following the depression of a secondary function designation key ([2ndf] key).

FIG. 7 is a view illustrating an external configuration of a scientific calculator in the prior art. As shown in FIG. 7, this method permits storing 10 function units with a combination of [2ndf] key and numeric value keys.

Referring to FIG. 7, Reference Numeral 81 designates a display unit of the calculator, 81a a numeric value display unit for displaying numeric values, and 81c a [2ndf] symbol indicating the selection of a secondary function.

Reference Numeral 82 designates a key input unit, 82a a unit conversion calculation key assigned as the secondary function of numeric value entering keys, which includes such keys as [in→cm], and [cm→in] keys, 82b a [2ndf] key for designating the secondary function, 82c a [ON/C] key for clearing calculations or turning on the calculator that has been turned off, 82d a key for performing function calculations, which includes such keys as [sin], [cos] keys and the like, 82e an argument key for entering numeric values, which includes such keys as [0] key through [9] key, 82f a key for designating the kind of calculations such as addition, subtraction, multiplication and division, which includes such keys as [+], [−], [×], and [÷] keys, 82g a key for performing memory calculations, which includes such keys as [X→M], [RM], [M+] keys, and 82h a [=] key for performing calculations such as addition, subtraction, multiplication and division.

FIG. 8 is a view illustrating a calculation example of unit conversion by a conventional scientific calculator. In the example shown in FIG. 8, the inch unit in 1.23 inches is converted into the centimeters.

Step 901: Step 901 clears the content of the calculator by operating the [ON/C] key.

Step 902: Step 902 enters 1.23 whose unit is to be converted.

Step 903: Step 903 selects the secondary function. In this operation, the secondary function described above the key switch will be made effective.

Step 904: Step 904 performs a conversion calculation. Operating [0] key performs the calculation of [in→cm], which is provided as a secondary function of [0] key.

However, it is impossible to assign many calculation conversion functions to numeric value entering keys whose number is restricted. Consequently, incorporating conversion calculation functions in excess of the number of numeric value entering keys has a drawback which demands either assigning the conversion functions to other keys than numeric value entering keys or increasing the number of functions assigned to numeric value entering keys as a tertiary or a quaternary function.

Thus, in either case, conventional calculators have a drawback that the number of conversion calculations depends on the number of keys.

As additional related art of the present invention a small size electronic calculator is known as disclosed in Japanese Laid-Open Patent Publication No. SHO 58-178459/1983. The calculator provides a plurality of unit keys and a memory for storing conversion values between units designated by the unit key to perform initialization of the conversion value to be stored in the memory by operating a unit key and to perform the unit conversion processing by using the conversion value stored in the memory. A unit conversion device is also disclosed in Japanese Laid-Open Patent Publication No. SHO 62-166551/1987, the device permitting the conversion between units in a combination of units absent in a memory of the device by storing a plurality of conversion rates in the memory so that the conversion rates can be used.

SUMMARY OF THE INVENTION

The present invention provides a scientific calculator that permits easily selecting a plurality of conversion calculations without being restricted by the number of keys either by adopting a method that allows selecting a plurality of unit conversion calculations by incorporating in an ordinary calculator a key exclusively used for unit conversion ([conv] key) specifying a unit conversion function so that such key can be combined with numeric value entering keys([0] key to [9] key) conventionally incorporated in the ordinary calculator, or by adopting a method which offers a guidance display by adding an exclusive symbol ([?]) in a date and numeric value display originally incorporated in the ordinary calculator for displaying the result of unit conversion calculations.

The present invention provides a scientific calculator having a scientific calculation mode for performing a scientific calculation and a conversion mode for converting a numeric value from one unit to another, said calculator comprising: conversion table storage means for storing as a conversion table a combination of each kind of conversion equation for converting a numeric value from one unit into another and a selection number attached to each conversion equation; key input means including numeric keys for entering a numeric value and a specific key for setting a mode to the conversion mode: numeric value storing means for storing the entered numeric value; mode setting means for setting the current mode to the conversion mode by pressing the specific key; designating means for designating the selection number in the conversion table during the conversion mode; reading means for reading from the conversion table the conversion equation corresponding to the designated selection number; conversion means for converting the numeric value stored in the numeric value storing means from one unit to another on the basis of the read conversion equation; and display means for displaying the converted numeric.

In accordance with the present invention, entering a predetermined selection number by the input means with the specific number displayed permits the calculation means to calculate the conversion calculation with the selected number.

BRIEF DESCRIPTION OF THE DRAWINGS

An object of the present invention will be made clear by the reference of the description, taken in connection with the accompanying drawings in which:

FIG. 5 is a view illustrating an calculation example of the unit conversion in the scientific calculator according to the present invention;

FIG. 6 is a view indicating a corresponding number of the conversion calculation with the scientific calculator according to the present invention;

FIG. 8 is a view illustrating a calculation example of a unit conversion with the conventional scientific calculator.

DETAILED DESCRIPTION OF THE PREFERRED EMBODIMENT

Figure 1:
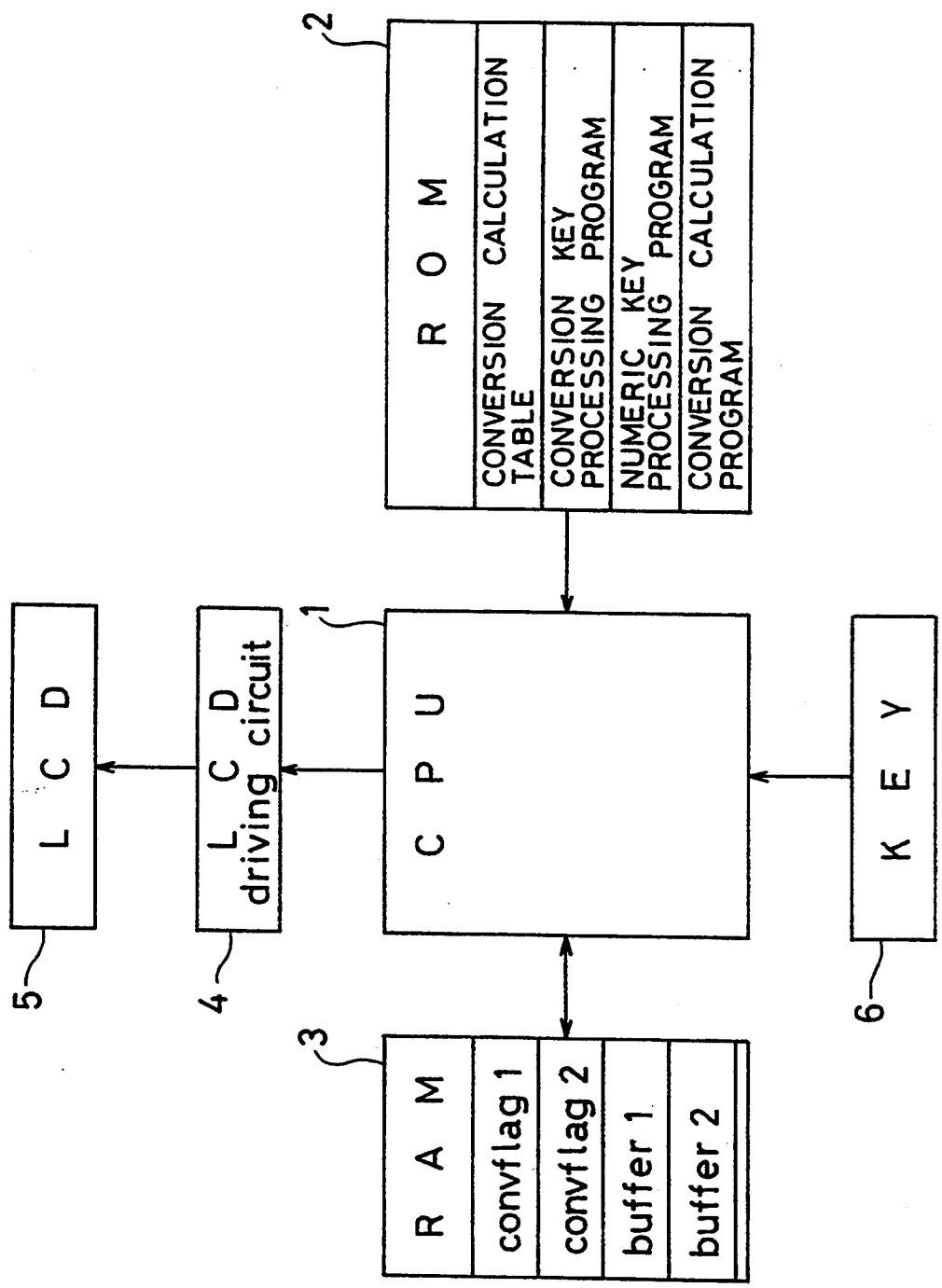
FIG. 1 is a block diagram illustrating a construction of one embodiment of applying the present invention to a 10-digit decimal display scientific calculator.

The present invention will be detailed in connection with a preferred embodiment shown in the drawings, but the embodiment is not intended to limit the scope of the invention.

The present invention can be applied to each kind of calculator, specifically scientific calculator both large and small, but the invention is particularly suitable for a pocket-size scientific calculator capable of function calculations.

The present invention will be detailed with respect to a pocket-size scientific calculator capable of function calculations. The present invention can be applied by adding a constituent requirement of the invention to a scientific calculator provided with basic functions of an ordinary calculator of this type.

In accordance with the present invention, key input means and the designating means are used as the input devices such as a keyboard, a pointing device, a touch sensor and an optical character reader.

As the mode setting means, the reading means and the conversion means, it is convenient to use a microcomputer comprising a CPU, a ROM, a RAM and an I/O port. As the conversion table storage means, a ROM in the microcomputer is used and as the numeric value storing means, a RAM in the microcomputer is used.

As display means, display devices such as a LCD device (liquid crystal display device), and an EL display devices are used.

FIG. 1 is a block diagram illustrating a construction of one embodiment of applying the present invention to a 10-digit decimal display scientific calculator. In FIG. 1, Reference Numeral 1 designates a CPU for controlling the calculator, 2 a ROM for storing a program and constants for use in operating the calculator, 3 a RAM used for controlling the calculator and as a numeric value memory, 4 an LCD driving circuit for controlling the LCD drive, 5 an LCD display unit for displaying numeric values and symbols, 6 a key matrix for detecting a key input.

In ROM 2 are stored a conversion calculation table, a [conv] key processing program, a numeric value key processing program, and a conversion calculation program. RAM 3 comprises convflag 1, convflag 2, buffer 1, and buffer 2.

Flags will be detailed hereinbelow (refer to FIGS. 3 and 4).

Convflag 1: convflag 1 memorizes set/reset states (1 bit construction). It is set by operating [conv] key to hold the set state during a conversion calculation. In other words, it indicates that the conversion calculation mode has been selected to set the calculator in a state of waiting for the input of a number (numeric value) in the first digit.

Convflag 2: convflag 2 memorizes set/reset states (with 1 bit construction). Input of a number (numeric value) in the first digit has been completed to set the calculator in a state of waiting for the input of a number (numeric value) in the second digit. In other words, it indicates a state of waiting for the input of a number (numeric value) in the second digit after completing the input of the first digit number.

Then, the buffers will be detailed hereinbelow (refer to FIGS. 3 and 4).

Buffer 1: buffer 1 memorizes one numeric value (it is possible to memorize numeric values 0 through 9 with 4 bit construction). It memorizes a number (numeric value) in the first digit.

Buffer 2: buffer 2 memorizes (it is possible to memorize numeric values 0 through 9 with 4 bit construction). It memorizes a number (numeric value) in the second digit.

Figure 2:
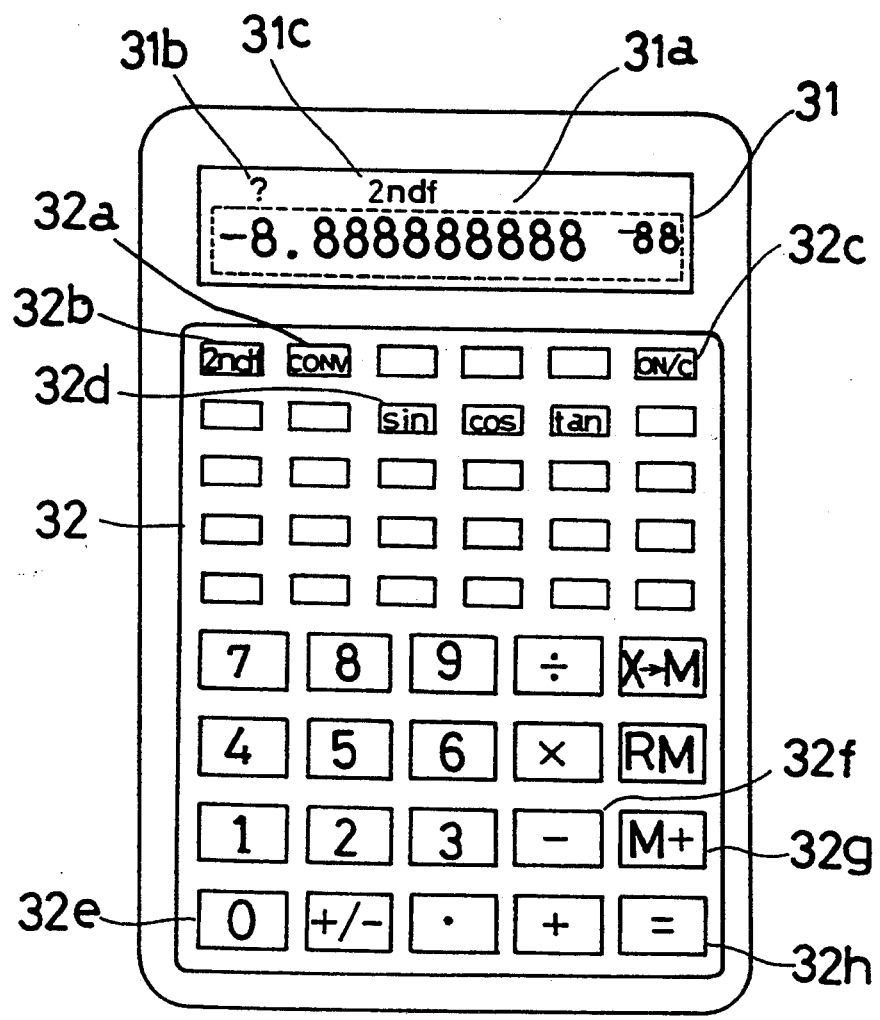
FIG. 2 is an external view illustrating the embodiment of applying the present invention to the 10-digit decimal display scientific calculator.

FIG. 2 is an external view illustrating one embodiment in which the present invention is applied to a 10-digit decimal scientific calculator. In FIG. 2, a scientific calculator capable of performing 98 kinds of conversion calculations only by adding a 10-digit display unit, and a [conv] key and a [?] symbol as an argument key.

Reference Numeral 31 designates a display unit of the calculator, 31a a date and numeric value display unit, 31b a [?] symbol used for forming a guidance display at performing conversion calculations, and 31c a [2ndf] symbol for designating the state of the secondary function selection.

Reference Numeral 32 designates a key input unit, 32a a [conv] key (conversion)for designating a conversion calculation mode, 32b a [2ndf] key (2nd function) for designating the secondary function, 32c a [ON/C] key, 32d a key for performing functions, which includes such keys as [sin], [con] and the like, 32e an argument key for entering numeric values such keys as [0] key through [9] key, 32f a key for designating four kind of calculations such as addition, subtraction, multiplication and division, which includes [+], [−], [×], and [÷] keys, 32g a key for memory calculations, which includes such keys as [X→M], [RM] and [M+] keys.

Figure 3:
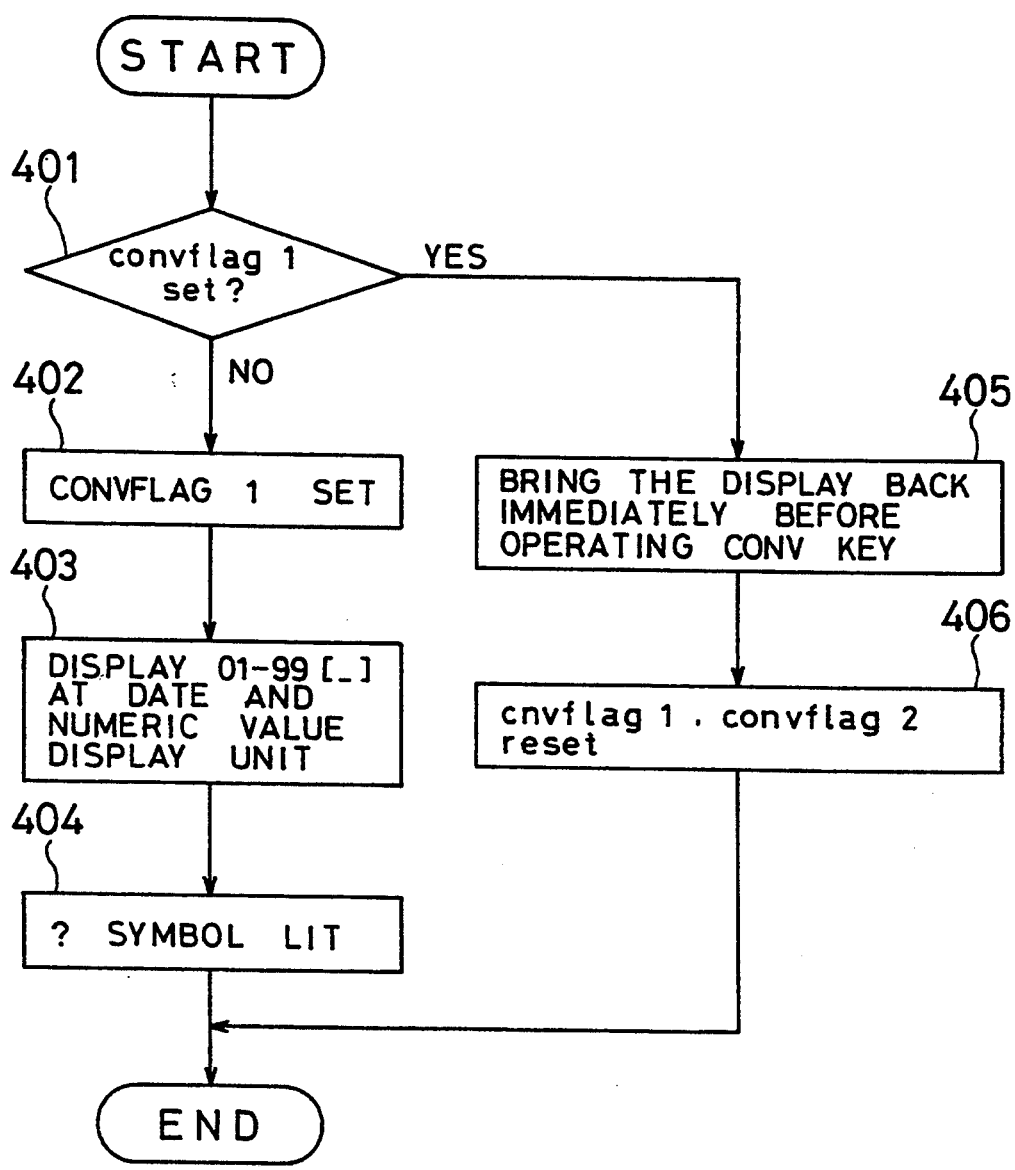
FIG. 3 is a flowchart indicating the function processing at a [conv] key specifying a unit conversion calculation according to the present invention.

FIG. 3 is a flowchart showing a function processing at a [conv] key for designating a unit conversion calculation in accordance with the present invention.

Step 401: Step 401 judges convflag 1 either to allow the process to proceed to Step 405 and Step 406 or to proceed to Step 402 through Step 404. When it is judged that the flag has been set or a conversion calculation mode has been selected, the process proceeds to Step 405 and Step 406. When it is judged that the flag has been reset, the process proceeds to Step 402 through 404.

Step 402: Step 402 sets convflag 1 to select a conversion calculation mode.

Step 403: Step 403 allows the calculator to display 01–99 [] at the date and numeric value display unit.

Step 404: Step 404 uses [?] symbol to display a guidance.

Step 405: Step 405 brings back the display to the state immediately before performing the conversion calculation.

Step 406: Step 406 resets convflag 1 and convflag 2.

Figure 4:
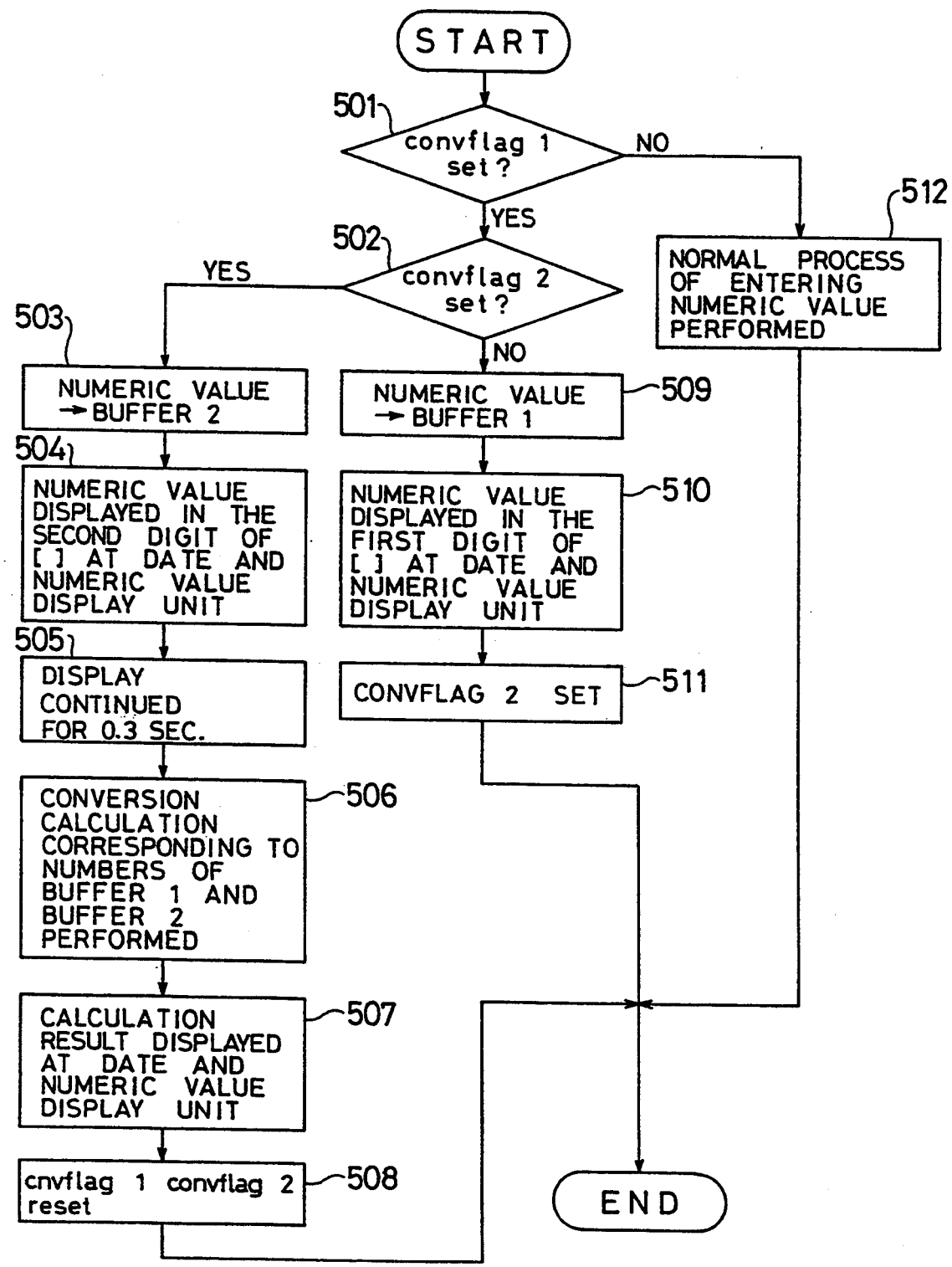
FIG. 4 is a flowchart indicating the function processing at a numeric value key according to the invention.
Figure 7:
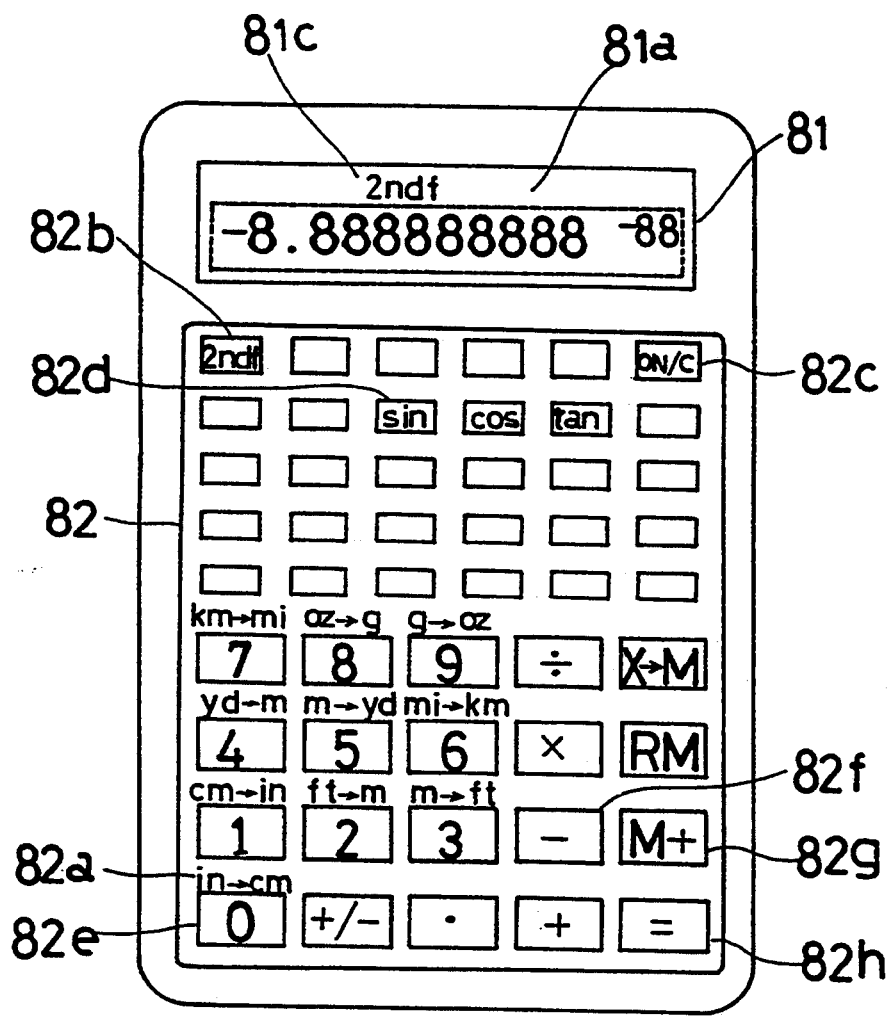
FIG. 7 is an external view of a conventional scientific calculator.

FIG. 4 is a flowchart showing a function processing of numeric value keys in accordance with the present invention. In FIG. 4 the following steps are detailed.

Step 501: Step 501 judges convflag 1 so that when the flag has been set, the process proceeds to Step 502 whereas when the flag has been reset, the process proceeds to Step 512 to perform respective processing.

Step 502: Step 502 judges convflag 2 so that when the flag has been set, the process proceeds to Step 503 whereas when the flag has been reset, the process proceeds to Step 509 to perform ordinary processing respectively.

Step 512: Step 512 functions when convflag 1 has been reset. At this point, since a conversion calculation has not been selected, an ordinary numeric value input is performed.

Step 509 through step 511: Step 509 through Step 511 functions when convflag 1 has been set and convflag 2 has been reset. At this point, the first digit number for a conversion calculation is entered. The entered numeric value is memorized in buffer 1. Additionally, the entered numeric value is displayed for guidance to enable users to confirm it. These steps set convflag 2 to indicate that the input of the first digit number has been completed.

Step 509: Step 509 allows the calculator to store the entered numeric value in buffer 1 on RAM 3.

Step 510: Step 510 allows the calculator to display the entered numeric value at a cursor () position of LCD 5 via a LCD driving circuit shown in FIG. 1.

Step 511: Step 511 sets convflag 2 to set the calculator in a state of waiting for the input of a numeric value in the second digit.

Step 503 through 508: Steps 503 through 508 functions when convflag 1 has been set and convflag 2 has been set. These steps allows entering the second digit number of conversion calculation and performing a calculation conversion corresponding to the number.

Step 503: Step 503 allows the calculator to memorize the entered numeric value in buffer 2 on RAM 3.

Step 504: in the same manner as Step 510, Step 504 allows the calculator to display the entered numeric value at the cursor () position of LCD 5.

Step 505: Step 505 allows the calculator to display the entered numeric value temporarily so that users can confirm it. In other words, it is displayed for 0.3 second.

Step 506: Step 506 performs a conversion calculation corresponding to numbers memorized in buffer 1 and buffer 2. ROM 2 shown in FIG. 1 memorizes the procedure in advance. Additionally, in ROM 2, there is provided a table (conversion table) showing a conversion calculation equation corresponding to the second digit shown in FIG. 6. The program functions to permit the calculator to display the conversion calculation corresponding to the second digit number by referring to the table.

Step 507: Step 507 allows LCD 5 to displays the result of the calculation in the similar manner as step 510.

Step 508: Step 508 resets flags, convflag 1 and convflag 2 to return to a normal calculation state as a post-calculation processing.

FIG. 5 is a view illustrating a calculation example of a unit conversion in the scientific calculator in accordance with the present invention. This particular example performs a process of converting 1.23 in (inches) into the cm's (centimeters).

Step 601: Step 601 cleared the content of a calculator with [ON/C] key operation.

Registers and flags used for calculations in RAM 3 in FIG. 1 are cleared to display "0" via a LCD driving circuit. At this point, convflag 1 and convflag 2 are reset.

Step 602: Step 602 allows entering 1.23 a numeric value to be converted.

Upon detecting a numeric value key input with key 6 shown in FIG. 1, the calculator performs a processing shown in Step 501 through 512 shown in FIG. 4 to enter a numeric value since the convflag has been reset in each key input operation.

Step 603: Step 603 selects a conversion calculation mode.

Symbol [?] denotes a guidance that promotes a number input whereas numeric representation 01–98 designates that a numeric value ranging from 01 through 98 can be entered. Then the underlined portion within [] represents a cursor display, which indicates that a numeric value to be entered will be entered at the cursor position, namely at the first digit of the number.

Upon detecting a [conv] key input with key 6 shown in FIG. 1, the calculator performs a processing shown in Step 401 through 404 shown in FIG. 3 since the convflag has been reset in each key input operation, thereby performing a guidance display shown in a display unit. At this point, convflag 1 is set.

Step 604: input of the number on the first line

Step 604 selects and enter Number '01' corresponding to the conversion calculation of in→cm from FIG. 6. At this point, convflag 1 has been set and convflag 2 has been reset. In FIG. 4, a processing from Step 501→Step 502→Step 509→Step 510 is performed to display the number on the first line. At this point, Step 511 sets convflag 2.

Step 605: Step 605 allows entering a numeric value in the second digit.

By entering the number in the second digit, the entered numeric value is temporarily displayed. At this point, both convflag 1 and convflag 2 have been set, Step 501 through Step 505 shown in FIG. 4 are performed to temporarily display the entered numeric value.

Step 606: Step 606 allows performing a conversion calculation.

After temporarily displaying the numeric value entered at Step 605, a conversion calculation corresponding to the input number is performed to display the result on a date and numeric value display unit (LCD 5). At this point, in FIG. 4, subsequent to Step 505 the processing from Step 506 through Step 508 is executed to perform the conversion calculation, thereby displaying the result of the calculation.

FIG. 6 is a view showing a conversion table in the scientific calculator in accordance with the present invention. Referring to FIG. 6, there is shown a correspondence of a 2-digit decimal numeric values identical to respective unit conversion calculation. Consequently, entering the 2-digit decimal numeric value subsequent to a [conv] key operation allows performing a conversion calculation corresponding to the number column.

[conv] 01: in→cm (conversion of the inches into the centimeters)

[conv] 02: cm→in (conversion of the centimeters into the inches)

[conv] 98: g→oz (conversion of the grams into the ounces)

Only adding to an ordinary calculator a key exclusively used for designating a unit conversion calculation and a symbol display exclusively used for displaying a designation key for designating a unit conversion permit performing a plurality of conversion calculations only with numeric number entering keys without depending on the number of keys.

What is claimed is:

1. A scientific calculator having a scientific calculation mode for performing a scientific calculation and a conversion mode for converting a numeric value from one unit to another, said calculator comprising:

conversion table storage means for storing as a conversion table a plurality of conversion equations for converting a numeric value from one unit into another and a selection number associated with each conversion equation;

key input means including a number of numeric keys for entering a numeric value and a specific key for setting the mode to the conversion mode:

numeric value storing means responsive to said key input means for storing the entered numeric value;

mode setting means responsive to said key input means for setting the current mode to the conversion mode by pressing the specific key;

designating means for designating a selection number in the conversion table during the conversion mode;

reading means responsive to said designating means for reading from the conversion table the conversion equation corresponding to the designated selection number;

conversion means responsive to said numeric value storing means and said reading means for converting the numeric value stored in the numeric value storing means from one unit to another on the basis of the read conversion equation;

display means for displaying the converted numeric value; and wherein the selection number in the conversion table comprises a 2-digit numeric value and the selection number is set with the 2-digit numeric value by the designating means.

2. A scientific calculator of claim 1, further comprising selection number memorizing means for storing the range of selection numbers that can be designated and selection number reading means responsive to said designating means for reading from the selection number memorizing means the selection number to display same on the display means.

3. A scientific calculator of claim 1, further comprising a specific symbol memorizing means for memorizing a specific symbol indicating that the conversion calculation mode has been set and specific symbol reading means for reading from the specific symbol memorizing means the specific symbol to display same in the display means responsive to the specific key setting the conversion calculation mode.

4. A scientific calculator of claim 3, wherein the specific symbol is a question mark which prompts the user to input the selection number.

5. A scientific calculator of claim 1, further comprising display continuation means for displaying for a predetermined time the selection number in the display means upon the designating means designating the selection number until the numeric value stored in the numeric value storing means is converted into another unit on the basis of a conversion equation corresponding to the selection number.

* * * * *